May 14, 1963
M. HINDEN
3,089,481
DAMPER SHAFT LOCK
Filed May 17, 1962
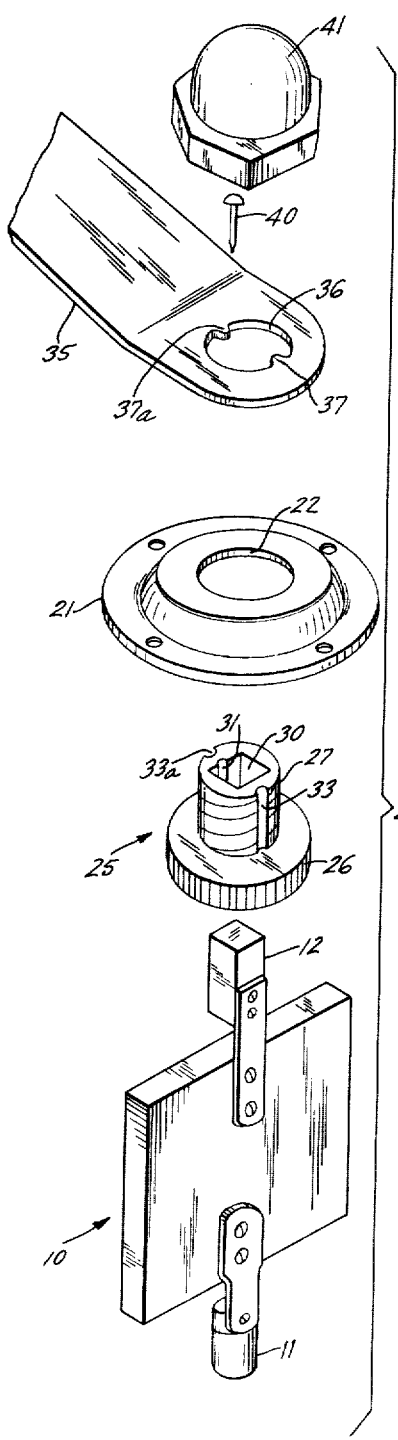
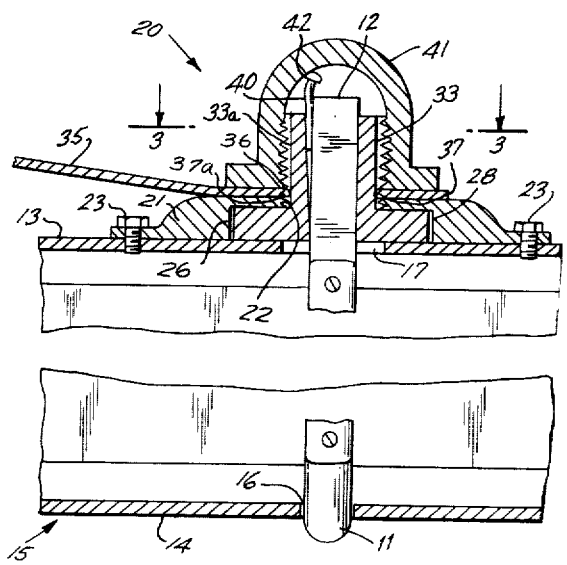
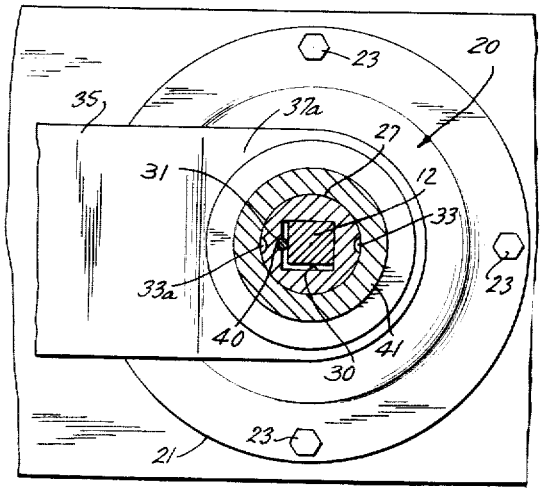
INVENTOR.
MILTON HINDEN
BY Mark Basseches
ATTORNEY

United States Patent Office 3,089,481
Patented May 14, 1963

3,089,481
DAMPER SHAFT LOCK
Milton Hinden, 15 Bay Link, Massapequa, N.Y.
Filed May 17, 1962, Ser. No. 195,602
7 Claims. (Cl. 126—295)

This invention relates to a damper regulator assembly, and more particularly to a regulator assembly which serves as the support and adjustment means for the shaft of a damper blade.

More particularly this invention relates to a shaft support and regulator for a damper blade as commonly used in ducts or like air conduits.

Still more particularly, this invention relates to a shaft support and regulator for a damper blade or the like of the type which is not frequently adjusted, i.e. which is adjusted to a predetermined desired setting and normally not shifted or varied from that setting. A typical instance where such regulator assembly is used is in the "balancing" of a ducted warm air or air conditioning system, i.e. the air flow in plural subsidiary ducts leading from a main duct is balanced by adjusting dampers and thereby metering or proportioning the amount of air admitted to each branch or subsidiary duct.

Regulator assemblies of the above mentioned type heretofore known have been subject to many operational defects, the principal one being that after a relatively short period of operation rattles develop in the device due to relative movement of the parts under the influence of vibrations in the ducts and the constant air flow against the damper blade. These rattles are transmitted throughout the duct and in some cases are magnified in the course of transmission to a point whereat the sounds may be heard throughout the areas serviced by the duct system.

The problem is augmented by the fact that the regulator lock assembly, usually some form of threaded fastener, tends to work loose under the vibratory influences above noted, increasing the tendency of the assembly to rattle and, in extreme cases, resulting in an alteration of the adjusted blade position.

Accordingly, it is an object of this invention to provide a novel damper regulator assembly which is substantially free from rattles. A further object of the invention is the provision of a damper regulator assembly of the type described wherein the adjusted position thereof will be retained, notwithstanding loosening of threaded regulator lock members.

Still a further object of the invention is the provision of a novel regulator assembly which provides a rattle-free construction, notwithstanding excessive tolerances in the parts or components of said assembly of a magnitude which would, in constructions heretofore known, produce objectionable rattling noises.

Still other and further objects will appear herein or be hereinafter pointed out in conjunction with a description of the drawings, in which—

FIGURE 1 is a preassembled perspective view of the components of the regulator assembly;

FIGURE 2 is a vertical section through a duct and regulator assembled thereto;

FIGURE 3 is a section taken on the line 3—3 of FIGURE 2.

In accordance with the invention, a damper blade 10 of sheet metal or the like is provided with bearing portions comprising a generally circular trunnion member 11 riveted or otherwise fixed to the blade along the center line thereof, the trunnion projecting beyond the marginal edge of the blade. A square key-stock member 12 is similarly fastened to the blade and projects beyond the opposite marginal edge of the blade.

The blade is suspended between opposite parallel walls 13, 14 of duct assembly 15, an aperture 17 being formed in wall 13 of a size rotatably to accommodate key 12. Similarly, an aperture 16 is formed in wall 14 of the duct 15.

The regulator assembly 20 includes a regulator plate 21 having a central aperture 22 fixed, as by sheet metal screws 23, to wall 13, with aperture 22 in registry with aperture 17 in the wall 13. A boss 25, including a disk-like base 26 and a threaded cylindrical neck 27, is rotatably received within cylindrical recess 28 formed in the plate 21, the neck 27 extending outwardly beyond the outer face of the plate 21.

The boss 25 is provided with a longitudinally extending square aperture 30 of a size to accommodate key 12 with minimum clearance. The boss is additionally formed with a slot portion 31, preferably tapered, joining and forming a part of aperture 30.

The outer, threaded neck portion 27 includes longitudinally directed slots or recesses 33, 33a for keying the boss 25 to the regulator handle 35. The handle 35 is formed with an aperture 36 adjacent one end thereof, the aperture defining walls having inwardly directed ears or lugs 37, 37a, lying, in the assembled position, within recesses 33 and 33a, respectively.

The boss 25 is preferably formed of a relatively soft, cast material including zinc, a satisfactory casting being found to have a Rockwell hardness of about B 34 to 38.

The assembly is completed by the provision of a wedge pin 40 disposed within recess 31 which is of a size to be accommodated within the latter, and a cap or acorn nut 41 which holds the parts together. The pin 40 is preferably of a greater hardness than the boss, being preferably in the range of Rockwell C 34 to 36. It should be understood that the hardness ranges for the pin and boss should not be taken in a limiting sense, being includeded as illustrative of preferred ranges.

The operation and mode of applying the assembly will be readily understood from the preceding description. With the square key 12 extending through aperture 17 of the duct, plate 21 with boss 25 fitted therein is fixed to the duct. The shaft 12 is sleeved in aperture 30 of the boss and handle 35 is applied over the neck 27 in the manner stated. Pin 40 is disposed in slot 31 and the sides of such pin will bear against the key or shaft 12 and the slot. Acorn nut 41 is threaded over neck 27. The inner surface of the nut 41 is preferably angularly or hemi-sperically formed, to define a curved or cam surface 42.

The pin 40 is of a length to hit against surface 42 prior to seating of the nut, to bind or force the handle against regulator plate 21. As nut 41 is tightened, pin 40 is progressively driven tightly into slot 31 and against the shaft or key 12, thereby tightly wedging the pin, boss and shaft together in a manner to prevent any rattling whatever between these parts. This is true even if the key 12 is undersized as respects aperture 30 of boss 25, as shown in FIGURE 3.

As nut 41 is progressively threaded over the neck 27 to press handle 35 against plate 21, pin 40 is wedged firmly between the boss and shaft, as heretofore stated, further rotation of the nut serving, not to augment the penetration of the pin into the boss, but instead, to laterally engage the head of the pin and bend the body of the pin inward, as clearly shown in FIGURE 2. Thus, the pin will be found tightly engaged with the shaft or key 12, the boss 25 and the inner surface of nut 41. It will thus be seen that the pin, in adition to wedging the shaft or key, acts also as a lockwasher to prevent accidental backing off of nut 41.

The length of pin 40 and the clearance between key 12 and aperture 30 are not critical, by reason of the action of the curved under surface of the cap in bending the pin. Further, the use of a zinc casting and pin, as aforesaid, provides secure connection even after the nut is removed since the action of tightening the nut will cause a penetration by the pin into the casing and, in some instances, a slight deformation of the key. Thus, while backing off of the nut will permit resetting of the damper, it will not result in loosening of the shaft and boss from each other.

While the invention has been described in its preferred form as using a tapered pin and tapered slot, it will be recognized that only one of these members need be tapered. Also, while the illustrated embodiment includes a discrete slot in the boss for reception of the pin 40, it will be understood that one of the entire walls of the keying aperture of the boss may be used, or a portion of the shaft stock may be tapered, and the claims are to be interpreted accordingly.

Having thus described the invention and illustrated its use, what is claimed as new and is desired to be secured by Letters Patent is:

1. A damper control assembly comprising a regulator plate having a bearing aperture, a boss rotatably received in said aperture and having a threaded neck portion extending outwardly beyond said plate, said boss having a main internal aperture extending generally axially through said boss and including a tapered wall portion, a regulator handle sleeved over said neck portion and bearing against said plate, a damper shaft having an eccentric portion extending through said aperture in said boss and forming a driving connection with said boss, a pin disposed in said main aperture and having side portions bearing, respectively, against said shaft and said tapered wall portion, said pin having its outer end extending outwardly beyond the end of said neck portion and a cap nut threaded over said neck portion and urging said handle against said plate, said nut including inner portions bearing against said pin and urging the latter tightly between said shaft and said tapered wall.

2. A damper control assembly comprising a regulator plate having a bearing aperture, a boss rotatably received in said aperture and having a threaded neck portion extending outwardly beyond said plate, said boss having a main internal aperture extending generally axially through said boss to define a shaft receiver member, a regulator handle mounted on said neck portion and bearing against said plate, a damper shaft having an eccentric portion extending through said aperture in said boss and forming a driving connection with said boss, a pin member disposed in said receiver member and having side portions bearing against said receiver member and said shaft, at least one of said members being tapered, said pin member having an outer end portion extending outwardly beyond the end of said neck portion and a cap nut threaded over said neck portion and urging said handle against said plate, said nut including inner portions bearing against said pin member and urging the latter into wedged engagement between said shaft and said receiver member.

3. A device in accordance with claim 1 wherein said inner portions of said nut are provided with a cam surface bearing against a lateral portion of the end of said pin, whereby a lateral deflecting force is applied to said pin upon tightening of said nut.

4. A device in accordance with claim 2 wherein said inner portions of said nut are provided with a cam surface bearing against said outer end of said pin member, whereby a lateral deflecting force is applied to said pin member upon tightening of said nut.

5. A damper control assembly comprising a regulator plate having a bearing aperture, a boss rotatably mountable in said aperture having a threaded neck portion adapted to extend outwardly beyond said plate in the mounted position of said boss, said boss having a main internal aperture of eccentric form extending generally axially through said boss and including a tapered wall portion, a regulator handle including keying portions insertible into complemental keying elements formed on said neck portion, a damper shaft having an eccentric portion endwisely insertible into said main aperture to form a driving connection with said boss, a pin insertible into said main aperture with side portions bearing against said shaft and said tapered wall portion, the outer end of said pin extending outwardly beyond the end of said neck portion, and a cap nut threadable over said neck portion arranged to urge said handle against said plate, said nut including inner portions adapted to force said pin tightly between said shaft and said tapered wall.

6. A device in accordance with claim 5 wherein said inner portions of said nut are provided with a cam portion bearing against a lateral portion of said end of said pin.

7. A damper control assembly comprising a regulator plate having a bearing aperture, a boss rotatably mounted in said aperture and having a threaded neck portion extending outwardly through said plate, said boss having an axially extending internal keying aperture formed therethrough, the walls defining said keying aperture defining, in addition, a tapered slot portion communicating with said aperture, a regulator handle keyed to said neck of said boss, a damper shaft having a keying portion extending through said aperture in said boss and forming a driving connection therewith, a wedge pin disposed in said slot with a side portion bearing against said shaft and an end portion extending outwardly of said neck, and a cap nut threaded over said neck portion and urging said handle against said plate, said nut including inner portions bearing against said pin and forcing said pin tightly against said shaft.

References Cited in the file of this patent
UNITED STATES PATENTS

| | | |
|---|---|---|
| 512,246 | Fisher | Jan. 2, 1894 |
| 928,950 | Durkin | July 27, 1909 |
| 2,123,998 | Koch | July 19, 1938 |

UNITED STATES PATENT OFFICE
CERTIFICATE OF CORRECTION

Patent No. 3,089,481

May 14, 1963

Milton Hinden

It is hereby certified that error appears in the above numbered patent requiring correction and that the said Letters Patent should read as corrected below.

Column 3, lines 24 and 42, after "aperture", each occurrence, insert -- of eccentric form --.

Signed and sealed this 24th day of August 1965.

(SEAL)
Attest:

ERNEST W. SWIDER
Attesting Officer

EDWARD J. BRENNER
Commissioner of Patents